(12) United States Patent
Nie et al.

(10) Patent No.: US 11,694,301 B2
(45) Date of Patent: Jul. 4, 2023

(54) LEARNING MODEL ARCHITECTURE FOR IMAGE DATA SEMANTIC SEGMENTATION

(71) Applicant: Alibaba Group Holding Limited, Grand Cayman (KY)

(72) Inventors: Dong Nie, Bellevue, WA (US); Jia Xue, Bellevue, WA (US); Xiaofeng Ren, Yarrow Point, WA (US)

(73) Assignee: Alibaba Group Holding Limited, George Town (KY)

( * ) Notice: Subject to any disclaimer, the term of this patent is extended or adjusted under 35 U.S.C. 154(b) by 127 days.

(21) Appl. No.: 17/039,098

(22) Filed: Sep. 30, 2020

(65) Prior Publication Data
US 2022/0101489 A1 Mar. 31, 2022

(51) Int. Cl.
| G06T 3/40 | (2006.01) |
| G06T 5/50 | (2006.01) |
| G06N 3/08 | (2023.01) |
| G06N 5/046 | (2023.01) |

(52) U.S. Cl.
CPC ............... G06T 3/40 (2013.01); G06N 3/08 (2013.01); G06N 5/046 (2013.01); G06T 5/50 (2013.01);
(Continued)

(58) Field of Classification Search
None
See application file for complete search history.

(56) References Cited

U.S. PATENT DOCUMENTS

| 8,494,285 B2 | 7/2013 | Zhang et al. |
| 9,865,042 B2 | 1/2018 | Dai et al. |
| 10,147,193 B2 | 12/2018 | Huang et al. |
| 10,635,927 B2 | 4/2020 | Chen et al. |
| 10,671,855 B2 | 6/2020 | Lee et al. |
| 10,679,351 B2 | 6/2020 | El-Khamy et al. |

(Continued)

FOREIGN PATENT DOCUMENTS

| CN | 110648334 A | * | 1/2020 |
| CN | 111079623 A | * | 4/2020 |

(Continued)

OTHER PUBLICATIONS

Brostow, G.J., Shotton, J., Fauqueur, J., Cipolla, R.: Segmentation and recognition using structure from motion point clouds. In: European conference on computer vision, Springer (2008), pp. 44-57.

(Continued)

Primary Examiner — Jiangeng Sun
(74) Attorney, Agent, or Firm — Lee & Hayes, P.C.

(57) ABSTRACT

A learning model may provide a hierarchy of convolutional layers configured to perform convolutions upon image features, each layer other than a topmost layer convoluting the image features at a lower resolution to a higher layer, and each layer other than a bottommost layer returning the image features to a lower layer. Each layer fuses the lower resolution image features received from a higher layer with same resolution image features convoluted at the layer, so as to combine large-scale and small-scale features of images. Layers of the hierarchy may be substantially equal to a number of lateral convolutions at a bottommost convolutional layer. The bottommost convolutional layer ultimately passes the fused features to an attention mapping module, which utilizes two attention mapping pathways in combination to detect non-local dependencies and interactions between large-scale and small-scale features of images without de-emphasizing local interactions.

19 Claims, 8 Drawing Sheets

(52) U.S. Cl.
CPC ............... *G06T 2207/20016* (2013.01); *G06T 2207/20081* (2013.01); *G06T 2207/20084* (2013.01); *G06T 2207/20221* (2013.01)

(56) References Cited

U.S. PATENT DOCUMENTS

| 2014/0037198 | A1 | 2/2014 | Larlus-Larrondo et al. |
| 2020/0020102 | A1 | 1/2020 | Dai et al. |
| 2020/0134375 | A1 | 4/2020 | Zhan et al. |
| 2020/0160067 | A1 | 5/2020 | Huang et al. |
| 2020/0160114 | A1 | 5/2020 | Wang et al. |

FOREIGN PATENT DOCUMENTS

| CN | 111340744 | A | * | 6/2020 |
| CN | 111340828 | A | * | 6/2020 |
| CN | 111598108 | A | * | 8/2020 |

OTHER PUBLICATIONS

Cordts, M., Omran, M., Ramos, S., Rehfeld, T., Enzweiler, M., Benenson, R., Franke, U., Roth, S., Schiele, B.: The cityscapes dataset for semantic urban scene understanding. In: Proceedings of the IEEE conference on computer vision and pattern recognition. (2016), pp. 3213-3223.

Yoo, Y., Han, D., Yun, S.: Extd: Extremely tiny face detector via iterative filter reuse. arXiv preprint arXiv:1906.06579 (2019).

Yu, C., Wang, J., Peng, C., Gao, C., Yu, G., Sang, N.: Bisenet: Bilateral segmentation network for real-time semantic segmentation. In: Proceedings of the European conference on computer vision (ECCV). (2018), pp. 325-341.

Zhao, H., Qi, X., Shen, X., Shi, J., Jia, J.: Icnet for real-time semantic segmentation on high-resolution images. In: Proceedings of the European Conference on Computer Vision (ECCV). (2018), pp. 405-420.

* cited by examiner

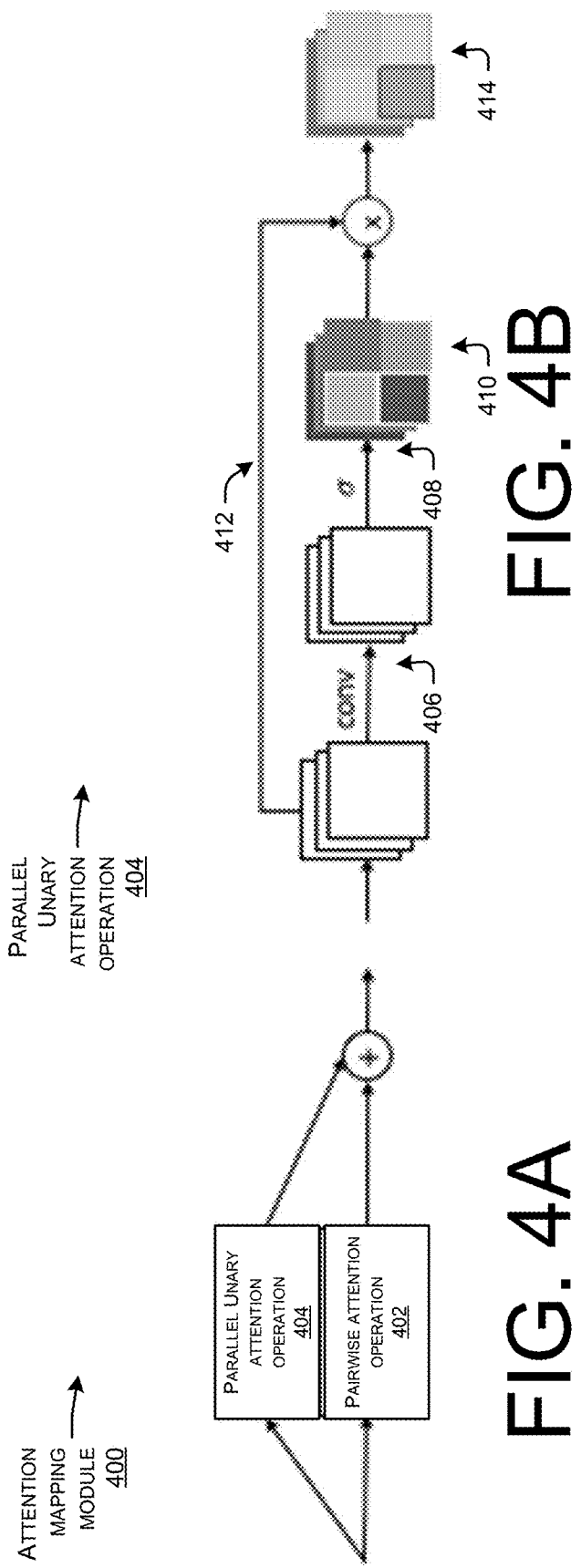

LEARNING MODEL ARCHITECTURE FOR IMAGE DATA SEMANTIC SEGMENTATION

BACKGROUND

Computer vision and machine vision technology, in a variety of domains such as image recognition and object recognition for autonomous vehicles, medical imaging, facial recognition, content-based image searches, and the like, all rely on processing raw image data into semantic image data. Raw images captured by image capture devices such as cameras and sensors do not inherently carry any semantic data identifying objects in the image or boundaries therebetween. As raw image data is computationally intensive to process by machine learning techniques, and current technological applications frequently cause raw image data to be generated or captured in massive quantities, a variety of technological domains require semantic segmentation of images to simplify raw pixel data and enrich semantic content of images before they are input into a learning model.

To achieve semantic segmentation, pixel data contained in an image should be partitioned into some number of differently-labeled segments, segments having boundaries therebetween. Each segment may convey different semantic meaning from at least some other segment. Pixel data may be partitioned based on aspects thereof such as similarities between pixels, differences between pixels, boundaries among pixels, and the like.

Demands on semantic segmentation are becoming increasingly nuanced as applications for computer vision and machine vision grow ever more sophisticated. For example, autonomous vehicles may need to process large quantities of image data, often from multiple capture devices or sensors, in order to promptly provide image recognition and object recognition results for real-time decision-making. Such applications may be deployed in a variety of environments, where captured images may include fine detail and objects having a variety of heterogeneous semantic meaning. Thus, there is a need for more robust semantic segmentation enabling richer semantic information to be derived from image data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A and 4B illustrate an attention mapping module according to example embodiments of the present disclosure.

DETAILED DESCRIPTION

Figure 1:
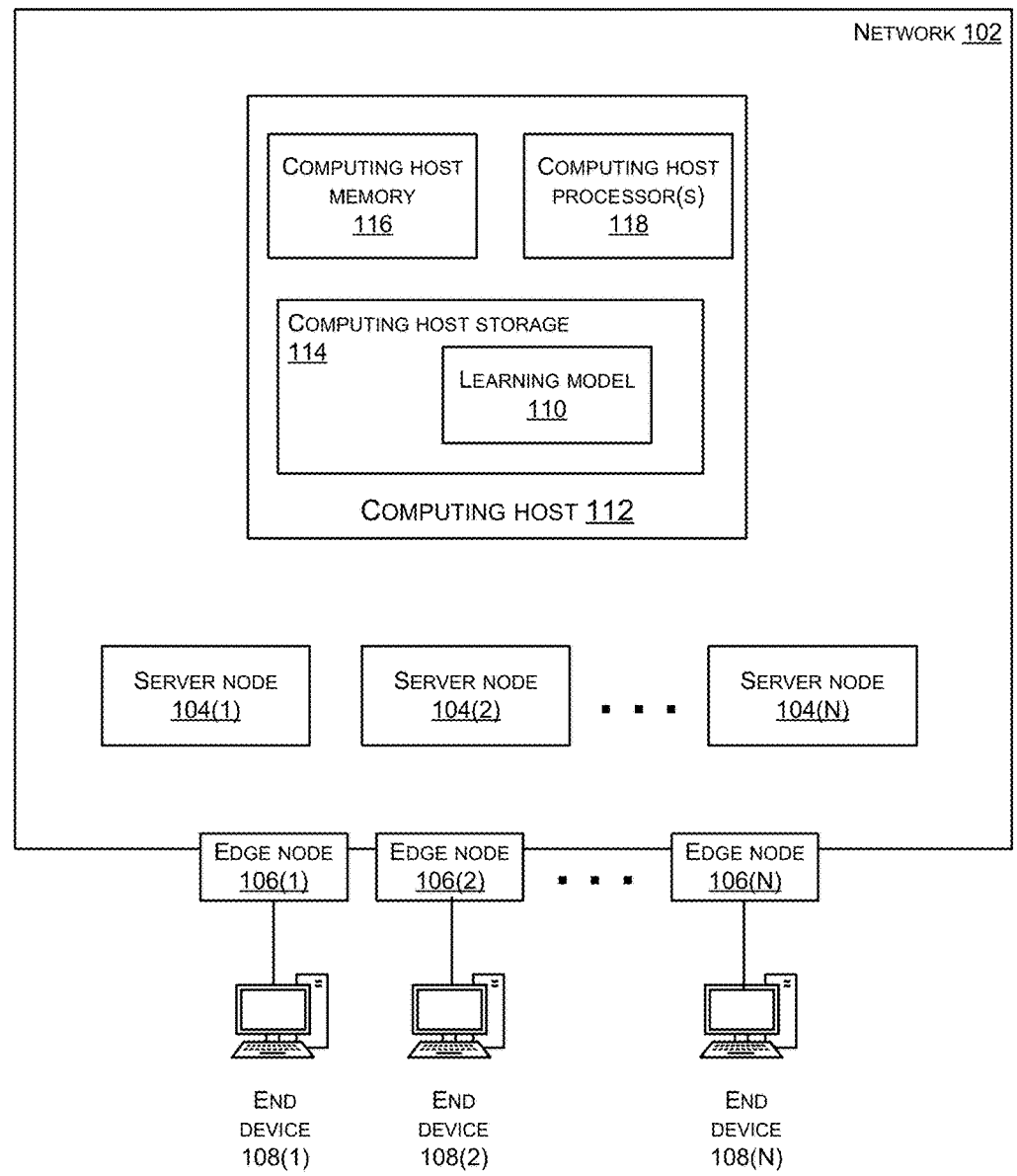
FIG. 1 illustrates an architectural diagram of a computing system according to example embodiments of the present disclosure.

Systems and methods discussed herein are directed to implementing image data semantic segmentation, and more specifically a novel architecture for convolutional learning models for semantic segmentation not relying on encoder-decoder architecture or pre-training.

A learning model, according to example embodiments of the present disclosure, may be a defined computation algorithm executable by one or more processors of a computing system to perform tasks that include processing input having various parameters and outputting results. A learning model may be, for example, a layered model such as a deep neural network, which may have a fully-connected structure, may have a feedforward structure such as a convolutional neural network ("CNN"), may have a backpropagation structure such as a recurrent neural network ("RNN"), or may have other architectures suited to the computation of particular tasks. Tasks may include, for example, classification, clustering, matching, regression, semantic segmentation, and the like.

Tasks may provide output for the performance of functions supporting computer vision or machine vision functions, such as recognizing objects and/or boundaries in images and/or video; tracking movement of objects in video in real-time; matching recognized objects in images and/or video to other images and/or video; providing annotations or transcriptions of images, video, and/or audio in real-time; and the like.

Cloud computing systems may provide collections of servers hosting computing resources to provide distributed computing, parallel computing, improved availability of physical or virtual computing resources, and such benefits. Cloud computing systems may host learning models to provide these benefits for the application of computing using learning models.

Commonly, in domains where computer vision or machine vision are applied, learning models may be pre-trained to provide ready-made parameters and weights which may be stored on storage of the cloud computing system and, upon execution, loaded into memory of the cloud computing system. For example, with regard to tasks relating to image recognition and related functions, commonly available pre-trained image classifier learning models include ResNet, VGGNet, Inception, Xception and the like. Such models may provide centralized computation based on intermediate outputs from other parts of learning models, and may be referred to by various terms, such as a "backbone." Other parts of learning models may be stored and executed on an edge device using local data as input, outputting intermediate data which is then forwarded to the central network of the learning model. The sub-networks may be segmented to be computable within the relatively lower computing resources available at an edge device compared to the cloud computing system, and such that intermediate data output by the sub-networks may be transported to the cloud computing system, such that latency resulting from the computation and network transport does not exceed tolerable levels in accordance with the real-time performance of the tasks being computed by the learning model, alleviating overall computational overhead.

Currently, a variety of learning networks implemented for semantic segmentation tasks rely on pre-trained backbones such as ResNet. Examples of such learning networks include UNet, VNet, AttentionUNet, UNet++, and RefineNet. Common to the architectures of these learning networks is an overall encoder-decoder structure, characterized by separate stacks of convolutional layers and deconvolutional forming, respectively, an encoder and a decoder. Samples of image data may be input into a first layer of an encoder, then convoluted through convolutional layers thereof and output from a last layer of the encoder, whereupon it may be input into a first layer of a decoder, then deconvoluted through deconvolutional layers thereof and output from a last layer of the decoder.

The functions of encoder and decoders in the learning model architecture may be to cause certain layers (i.e., later layers of encoders and earlier layers of decoders) to receive images having lower resolution, and other layers (i.e., earlier layers of encoders and later layers of decoders) to receive images having higher resolution. Between convolutional layers of an encoder, outputs from an earlier layer may be down-sampled before being input into a subsequent layer. Between deconvolutional layers of a decoder, outputs from an earlier layer may be up-sampled by an up-sampler before being input into a subsequent layer. Those layers taking low-resolution image data as input may be expected to detect and perform operations on large-scale features of the image data, such as whole objects or groups of objects and inter-object relationships; those layers taking high-resolution image data as input may be expected to detect and perform operations on small-scale features of the image data, such as parts of objects, individual objects, and objects at fine resolutions.

Moreover, the architectures of such learning networks further include skip connections from encoder layers and decoder layers which correspond to a same image resolution; since, among decoder layers, up-sampling image data which has already been down-sampled in the encoder layers may fail to reconstruct details which were lost during down-sampling, skip connections may allow image data containing those details prior to being lost through down-sampling to be conveyed to decoder layers.

A shortcoming of such learning model architectures is that layers processing low-resolution image data are inherently some number of layers removed from layers processing high-resolution image data. Therefore, it is challenging for layers to detect interactions between low-resolution image data and high-resolution image data. For example, an image may contain multiple high-resolution objects which are more easily detected at large-scale than small-scale, such as, in a photograph of a street, multiple lampposts spaced apart over distances. At the original resolution of the photograph, each individual lamppost may be detected as a small-scale feature, but it may be much more challenging to detect a semantic relationship between each individual lamppost; outside of immediately surrounding pixels in surrounding semantic contexts, existing algorithms generally will not compare pairwise pixels which are spread further apart. Moreover, at smaller resolutions, it may be more feasible to compare pixels containing information of the individual lampposts, but the lampposts themselves may no longer be discernable due to down-sampling. Thus, the individual lampposts, as small-scale features detected at a high image resolution, may need to be related to large-scale patterns detected at a low image resolution to enable multiple individual lampposts to be related semantically to each other.

Pre-trained backbones are generally not trained to detect interactions between low-resolution image data and high-resolution image data, and due to the large-scale nature of backbones and massive datasets used to pre-train backbones (such as the ImageNet dataset, containing more than 14 million images), it is impractical to attempt to retrain backbones to account for such interactions.

Thus, example embodiments of the present disclosure provide a learning model architecture which accounts for these shortcomings of existing learning models, enabling the model to be trained to detect interactions between low-resolution image data and high-resolution image data without relying on pre-trained backbones.

FIG. 1 illustrates an architectural diagram of a learning system 100 hosting a learning model according to example embodiments of the present disclosure. As described above, according to example embodiments of the present disclosure, a cloud computing system may be operative to provide server host functionality for hosting computing resources, supported by a computing host such as a data center hosting a learning model. Thus, this figure illustrates some possible architectural embodiments of computing devices as described above.

The learning system 100 may be implemented over a network 102 of physical or virtual server nodes 104(1), 104(2), . . . , 104(N) (where any unspecified server node may be referred to as a server node 104) connected by physical or virtual network connections. Furthermore, the network 102 terminates at physical or virtual edge nodes 106(1), 106(2), . . . , 106(N) (where any unspecified edge node may be referred to as an edge node 106) located at physical and/or logical edges of the network 102. The edge nodes 106(1) to 106(N) may connect to any number of end devices 108(1), 108(2), . . . , 108(N) (where any unspecified end device may be referred to as an end device 108).

A learning model 110 implemented on a computing host accessed through an interface of the learning system 100 as described in example embodiments of the present disclosure may be stored on physical or virtual storage of a computing host 112 ("computing host storage 114"), and may be loaded into physical or virtual memory of the computing host 112 ("computing host memory 116") in order for one or more physical or virtual processor(s) of the computing host 112 ("computing host processor(s) 118") to perform computations using the learning model 110 to compute semantic segmentation as described herein. Computing host processor(s) 118 may be special-purpose computing devices facilitating computation of matrix arithmetic computing tasks. For example, computing host processor(s) 118 may be one or more special-purpose processor(s) 104 as described above, including accelerator(s) such as Neural Network Processing Units ("NPUs"), Graphics Processing Units ("GPUs"), Tensor Processing Units ("TPU"), and the like.

According to example embodiments of the present disclosure, different modules of a learning model as described below with reference to FIGS. 2-4B and FIG. 6 may be executed by different processors of the computing host processor(s) 118 or may execute by a same processor of the computing host processor(s) 118 on different cores or different threads, and each module may perform computation concurrently relative to each other submodule.

Figure 2:
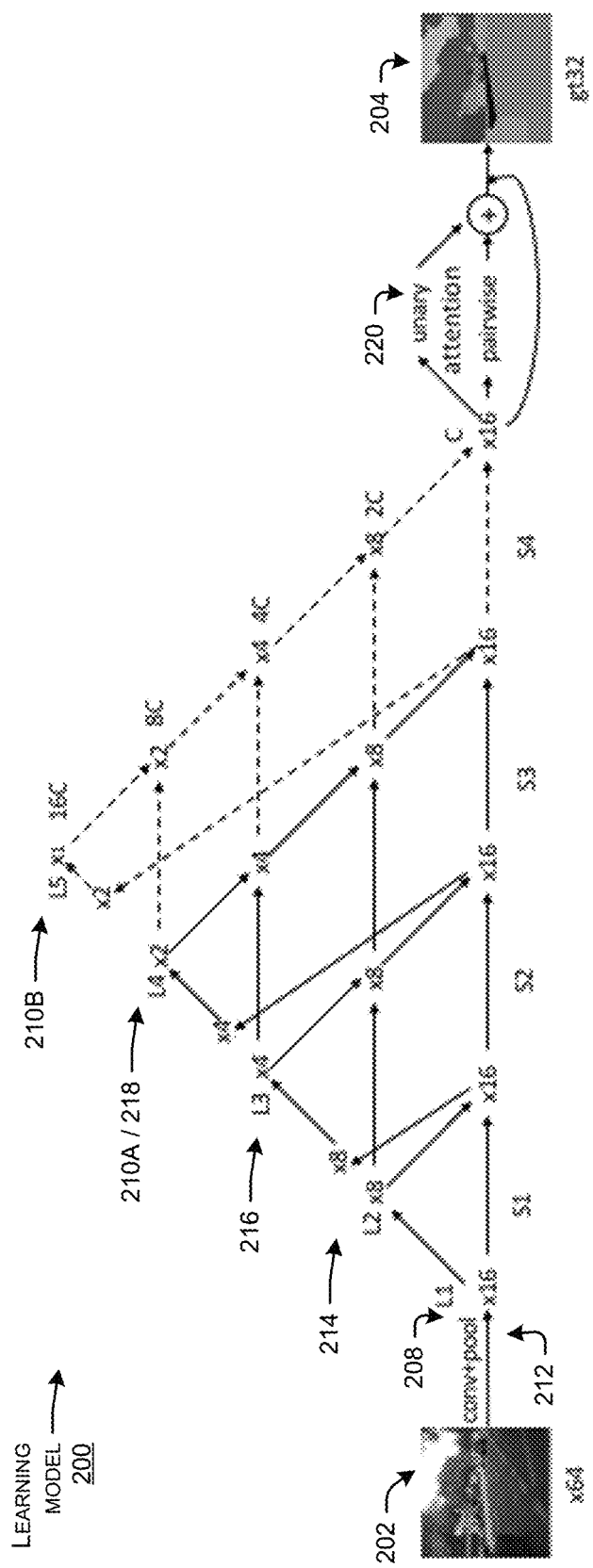
FIG. 2 illustrates a diagram of a learning model according to example embodiments of the present disclosure.

FIG. 2 illustrates a diagram of a learning model 200 according to example embodiments of the present disclosure. As illustrated herein, sample image data 202 is input into the learning model 200, and a segmentation 204 of the sample image data 202 is ultimately output from the learning model 200.

The learning model 200 includes a number of convolutional layers 206 arranged in a top-bottom hierarchy. Each convolutional layer 206 receives image data of a particular resolution, and the convolutional layers 206 are arranged, from bottom to top, in order of highest to lowest resolution (including sampled resolutions). Thus, a bottommost convolutional layer 208 may have a highest resolution (which may or may not be a sampled resolution, as shall be subsequently elaborated upon), and a topmost convolutional layer 210A or 210B may have a smallest sampled resolution. There may be any number of additional convolutional layers between the topmost and bottommost, depending on the magnitude of the difference in resolution between the highest and lowest resolutions (including sampled resolutions). In cases where there is a larger difference between the highest and lowest resolutions, more convolutional layers may be added to keep each down-sampling and up-sampling to gradual differences rather than drastic differences in resolution.

According to example embodiments of the present disclosure as illustrated in FIG. 2, the learning model 200 may include four layers (illustrated in solid lines) or five layers (additionally illustrated in broken lines in addition to the solid lines). Thus, the respective bottommost convolutional layers 208 of these two embodiments are the same, but the topmost convolutional layer 210A of the four layer embodiment is not the topmost convolutional layer 210B of the five layer embodiment, which is not present in the four layer embodiment. All elements of the learning model 200 as described herein apply to both the four layer embodiment and the five layer embodiment except where expressly specified otherwise.

As illustrated in FIG. 2, a resolution is designated as 1x, where x is an arbitrary integer indicating a resolution of an image file (though such a resolution can also be further down-sampled; this designation is merely for indicating a smallest resolution which will be discussed relative to other resolutions within the scope of the present disclosure). An original resolution of the original sample image data 202 is designated relative to x as 64x, or 64 times the resolution of x. Additional resolutions include 2x, 4x, 8x, and 16x, each being designated as a smaller multiple of x. An original resolution of the original sample image data may, or may not, be among these resolutions (for reasons which shall be elaborated upon subsequently); in the case that the original resolution is among these resolutions, the original resolution may be the highest among these resolutions (such as 16x, as shown above), and each other resolution may be a sampled resolution; in the case that the original resolution is not among these resolutions, each of these resolutions may be a sampled resolution. In the case that the original resolution is among these resolutions, one convolutional layer 206 may receive input of the original resolution while each other convolutional layer 206 receives input of a sampled resolution; in the case that the original resolution is not among these resolutions, each convolutional layer 206 receives input of a sampled resolution.

As illustrated in FIG. 2, only a topmost convolutional layer 210B of the five layer embodiment of the learning model 200 receives image data of resolution 1x; a topmost convolutional layer 210A of the four layer embodiment of the learning model 200 receives image data of resolution 2x instead, and image data is never down-sampled to 1x resolution in the four layer embodiment.

At each resolution, sample image data may have a number of channels for the purpose of matrix operations which perform convolution upon the sample image data. According to example embodiments of the present disclosure, a base number of channels may be designated as C (though it may be possible for image data to have fewer channels; this designation is merely for indicating a smallest number of channels which will be discussed relative to other numbers of channels within the scope of the present disclosure). Multiples of the base number of channels may be referred to as 2C, 4C, 8C, 16C, and the like.

According to example embodiments of the present disclosure, at a preliminary convolutional layer 212 of the learning model 200, the preliminary convolutional layer 212 may perform down-sampling convolution upon the original sample image data. The original sample image data may be 64x resolution sample image data. Resolution of the 64x resolution sample image data may be down-sampled to 16x resolution by a stride of the preliminary convolutional layer 212; a pooling layer of the convolutional layer 212; or a combination thereof. According to example embodiments of the present disclosure, both a strided convolution and a pooling convolution are applied to the sample image data. The bottommost convolutional layer 208 receives the 16x resolution sample image data as a first input to the bottommost convolutional layer 208. Such example embodiments of the present disclosure wherein down-sampling convolution is performed at the preliminary convolutional layer 212 may be implemented based on learning systems 100 wherein computing power of computing host processor(s) 118 does not yield desired performance given resolutions of original sample image data (e.g., image data above a certain resolution may cause bottlenecks caused by processor frequency of the computing host processor(s) 118, data bus bandwidth of computing host processor(s) 118, and the like) but does yield desired performance given resolutions of down-sampled sample image data.

According to such example embodiments of the present disclosure wherein down-sampling convolution is performed at the preliminary convolutional layer 212, the 16x resolution sample may be defined as having C channels.

Alternatively, at a preliminary convolutional layer 212 of the learning model 200, the preliminary convolutional layer 212 may pass the original sample image data to the bottommost convolutional layer 208 without performing down-sampling convolution upon the original sample image data. Thus, in the case that the original sample image data is 64x resolution sample image data, the bottommost convolutional layer 208 receives the 64x resolution sample image data as a first input to the bottommost convolutional layer 208; in the case that the original sample image data is 16x resolution sample image data, the bottommost convolutional layer 208 receives the 16x resolution sample image data as a first input to the bottommost convolutional layer 208; and so on. Such example embodiments of the present disclosure wherein down-sampling convolution is not performed at the preliminary convolutional layer 212 may be implemented based on learning systems 100 wherein computing power of computing host processor(s) 118 yield desired performance given resolutions of original sample image data (e.g., computing host processor(s) 118 have sufficient processor frequency, data bus bandwidth, and the like, to process original sample image data without incurring bottlenecks; original sample image data is comparatively low resolution such that a wide range of computing host processor 118 specifications may process the image data without incurring bottlenecks; and the like).

According to such example embodiments of the present disclosure wherein down-sampling convolution is not performed at the preliminary convolutional layer 212, whichever resolution sample is passed to the bottommost convolutional layer 208 may be defined as having C channels.

The bottommost convolutional layer 208 performs convolution upon the down-sampled sample image data. According to example embodiments of the present disclosure, a strided convolution, a pooling convolution, or a combination thereof may be applied to the 16x resolution sample image data. Furthermore, a convolution of the bottommost convolutional layer 208 may be C channels in width, with the convolution increasing the number of channels of the sample image data to 2C. Additionally, the 16x resolution sample image data may be multiplied with the sample image data output of the convolution operation by a skip connection as a residual. The convolution operation may output 16x resolution features of the sample image data.

The 16x resolution features are down-sampled to 8x resolution features, and the 8x resolution features, as a first output of the bottommost convolutional layer 208 (or as an output of a pooling layer thereof), are output to a next convolutional layer 214, represented in FIG. 2 as an upward and rightward arrow.

However, the bottommost convolutional layer 208 also performs convolution upon the 16x resolution features within the same convolutional layer, represented in FIG. 2 as a lateral arrow within the same convolutional layer; upon receiving 8x resolution features from the next convolutional layer 214 as a second input to the bottommost convolutional layer 208 (as shall be described subsequently), the bottommost convolutional layer 208 may perform feature fusion between the 16x resolution features and the 8x resolution features, as shall be described subsequently with reference to FIG. 3. Such feature fusion may be performed each time upon receiving 8x resolution features from the next convolutional layer 214. The fused features, which are 16x in resolution, as a second output of the bottommost convolutional layer 208, are successively output to increasingly higher convolutional layers: first a next convolutional layer 214, then a yet next convolutional layer 216, and then a topmost convolutional layer 210A or a yet further next convolutional layer 218, represented in FIG. 2 as successive upward and leftward arrows.

It should be noted that after features are output to the bottommost convolutional layer 208, features, rather than sample image data, are received as input by each subsequent convolutional layer. Each subsequent convolutional layer may perform convolution upon features rather than underlying sample image data.

Thus, the next convolutional layer 214 performs convolution upon the first fused 16x resolution features, received from the bottommost convolutional layer 208 as a first input to the next convolutional layer 214. According to example embodiments of the present disclosure, a strided convolution, a pooling convolution, or a combination thereof may be applied to the fused 16x resolution features.

Furthermore, a convolution of the next convolutional layer 214 may be 2C channels in width, with the convolution increasing the number of channels of the features to 4C. Additionally, the fused 16x resolution features may be multiplied with the features output of the convolution operation by a skip connection as a residual.

The 8x resolution features are down-sampled in convolution to 4x resolution features, and the 4x resolution features, as a first output of the next convolutional layer 214 (or as an output of a pooling layer thereof), are output to a further next convolutional layer 216, represented in FIG. 2 as an upward and rightward arrow.

However, the next convolutional layer 214 also performs convolution upon the 8x resolution features, represented in FIG. 2 as a lateral arrow within to the same convolutional layer; upon receiving 4x resolution features from the further next convolutional layer 216 as a second input to the next convolutional layer 214 (as shall be described subsequently), the next convolutional layer 214 may perform feature fusion between the 8x resolution features and the 4x resolution features, as shall be described subsequently with reference to FIG. 3. Such feature fusion may be performed each time upon receiving 4x resolution features from the further next convolutional layer 216. The fused features, which are 8x in resolution, as a second output of the next convolutional layer 214, are passed to a bottommost convolutional layer 208, represented in FIG. 2 as a downward and rightward arrow.

Figure 3:
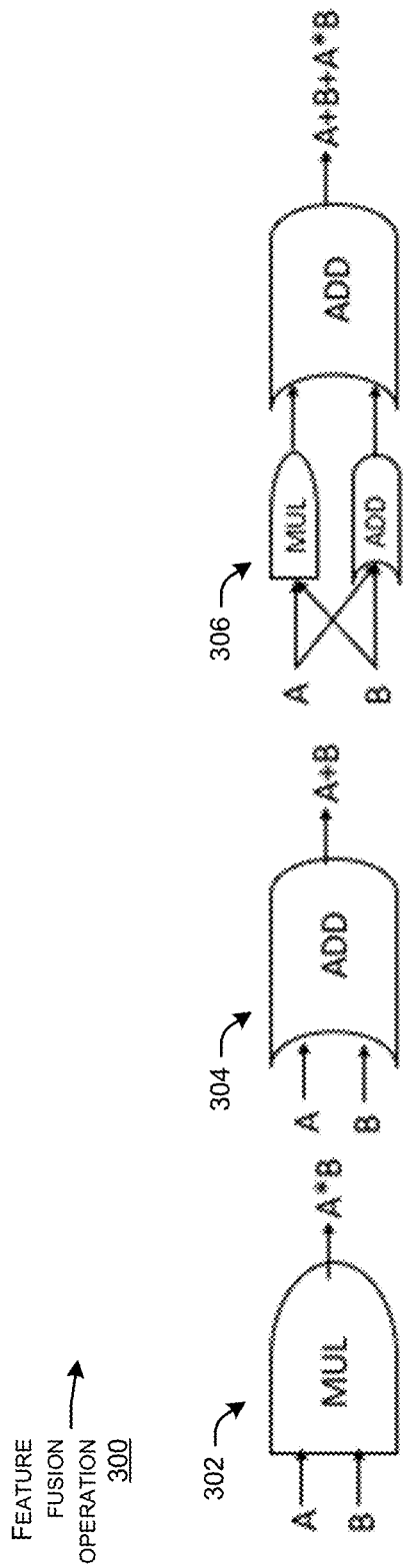
FIG. 3 illustrates a feature fusion operation according to example embodiments of the present disclosure.

Furthermore, the next convolutional layer 214 also receives 8x resolution sample features, output from the bottommost convolutional layer 208, as a third input to the next convolutional layer 214, and returns the 8x resolution sample features, as a third output of the next convolutional layer 214, to the bottommost convolutional layer 208, causing the bottommost convolutional layer 208 to perform feature fusion between 16x resolution features and the 8x resolution features, as shall be described subsequently with reference to FIG. 3.

Similarly, the further next convolutional layer 216 performs convolution upon the second fused 16x resolution features, received from the bottommost convolutional layer 208 as a first input to the further next convolutional layer 216. According to example embodiments of the present disclosure, a strided convolution, a pooling convolution, or a combination thereof may be applied to the fused 16x resolution features.

Furthermore, a convolution of the further next convolutional layer 216 may be 4C channels in width, with the convolution increasing the number of channels of the features to 8C. Additionally, the fused 16x resolution features may be multiplied with the features output of the convolution operation by a skip connection as a residual.

The 4x resolution features are down-sampled in convolution to 2x resolution features, and the 2x resolution features, as a first output of the further next convolutional layer 216 (or as an output of a pooling layer thereof), are output to a yet further next convolutional layer 218, which may be a topmost convolutional layer 210A according to four layer example embodiments of the present disclosure.

However, the further next convolutional layer 216 also performs convolution upon the 4x resolution features, represented in FIG. 2 as a lateral arrow within the same convolutional layer; upon receiving 2x resolution features from the yet further next convolutional layer 218 as a second input to the further next convolutional layer 216 (as shall be described subsequently), the further next convolutional layer 216 may perform feature fusion between the 4x resolution features and the 2x resolution features, as shall be described subsequently with reference to FIG. 3. Such feature fusion may be performed each time upon receiving 2x resolution features from the yet further next convolutional layer 218. The fused features, which are 4x in resolution, as a second output of the further next convolutional layer 216, are passed to a next convolutional layer 214, represented in FIG. 2 as a downward and rightward arrow.

Furthermore, the further next convolutional layer 216 also receives 4x resolution sample features, output from the next convolutional layer 214, as a third input to the further next convolutional layer 216, and returns the 4x resolution sample features, as a third output of the further next convolutional layer 216, to the next convolutional layer 214, causing the next convolutional layer 214 to perform feature fusion between 8x resolution features and the 4x resolution features, as shall be described subsequently with reference to FIG. 3.

Similarly, the yet further next convolutional layer 218 (which may be a topmost convolutional layer 210A according to four layer example embodiments of the present disclosure) performs convolution upon the third fused 16x resolution features, received from the bottommost convolutional layer 208 as a first input to the yet further next convolutional layer 218. According to example embodiments of the present disclosure, a strided convolution, a pooling convolution, or a combination thereof may be applied to the fused 16x resolution features.

Furthermore, a convolution of the yet further next convolutional layer 218 may be 8C channels in width. According to five layer example embodiments of the present disclosure, the convolution may further increase the number of channels of the features to 16C. Additionally, the fused 16x resolution features may be multiplied with the features output of the convolution operation by a skip connection as a residual.

According to four layer example embodiments of the present disclosure, the 2x resolution features are not down-sampled further; however, according to five layer example embodiments of the present disclosure, the 2x resolution features are down-sampled in convolution to 1x resolution features, and the 1x resolution features, as a first output of the yet further next convolutional layer 218 (or as an output of a pooling layer thereof), are output to a topmost convolutional layer 210B, represented in FIG. 2 as an upward and rightward arrow.

According to five layer example embodiments of the present disclosure, the yet further next convolutional layer 218 also performs convolution upon the 2x resolution features, represented in FIG. 2 as a lateral arrow within the same convolutional layer; upon receiving 1x resolution features from the topmost convolutional layer 210B as a second input to the yet further next convolutional layer 218 (as shall be described subsequently), the yet further next convolutional layer 218 may perform feature fusion between the 2x resolution features and the 1x resolution features, as shall be described subsequently with reference to FIG. 3. Such feature fusion may be performed each time upon receiving 1x resolution features from the topmost convolutional layer 210B. The fused features, which are 2x in resolution, as a second output of the yet further next convolutional layer 218, are passed to a further next convolutional layer 216, represented in FIG. 2 as a downward and rightward arrow.

In both the four layer example embodiment and the five layer example embodiment, the yet further next convolutional layer 218 also receives 2x resolution sample features, output from the further next convolutional layer 216, as a third input to the yet further next convolutional layer 218, and returns the 2x resolution sample features, as a third output of the yet further next convolutional layer 218, to the further next convolutional layer 216, causing the further next convolutional layer 216 to perform feature fusion between 4x resolution features and the 2x resolution features, as shall be described subsequently with reference to FIG. 3.

Overall, regardless of whether the learning model 200 is according to a four layer example embodiment, a five layer example embodiment, or yet other possible embodiments, the number of convolutional layers of the learning model 200 is substantially equal to the number of lateral convolutions and feature fusions performed at the bottommost convolutional layer 208. Consequently, the learning model 200 may be visualized as a substantially equilateral triangle, where "length" of two sides are each equal to the number of upward convolutions between convolutional layers, and "length" of the base is equal to the number of lateral convolutions at the bottommost convolutional layer 208.

Experimentally, the "equilateral triangle" architecture for the learning model 200 has been determined to generally outperform alternative architectures, as shall be shown subsequently.

Based on the above, it may be seen that the bottommost convolutional layer 208 may, upon each time performing feature fusion between 16x resolution and 8x resolution features, pass the fused features upward to a higher convolutional layer. For each upward pass, the fused features may be passed to a successively higher convolutional layer: first the next convolutional layer 214, then the further next convolutional layer 216, then the yet further next convolutional layer 218. These upward passes are illustrated in FIG. 2 as leftward, rather than rightward, upward arrows. According to the "equilateral triangle" architecture as described above, the number of upward passes should result in each higher convolutional layer being passed to once except a topmost convolutional layer.

Following the final lateral convolution by the bottommost convolutional layer 208, the bottommost convolutional layer 208 may pass the fused features to an attention mapping module 220. According to example embodiments of the present disclosure, an attention mapping module 220 may operate by multiple attention-mapping strategies to determine semantic dependencies across non-local pixels. Architecture of the attention mapping module 220 is subsequently described with reference to FIGS. 4A and 4B.

FIG. 3 illustrates a feature fusion operation 300 according to example embodiments of the present disclosure.

The feature fusion operation 300 takes a higher-resolution feature A and a lower-resolution feature B as inputs. For each channel $A_i$ and $B_i$ of the features A and B, the channels are multiplied at 302 after applying a transformation $F^m$ to $B_i$ as follows:

$$A_i \cdot F^m(B)_i$$

The channels are added at 304 after applying a transformation $F^a$ to $B_i$ as follows:

$$\alpha_i A_i + \beta_i F^a(B)_i$$

Wherein $\alpha_i$ and $\beta_i$ may be weights of a trained weight set of the learning model 200.

And the sum and the product obtained from, respectively, the addition and the multiplication are added at 306 after applying a further transformation $F^{ma}$ to the product as follows:

$$Y_i = \alpha_i A_i + \beta_i F^a(B)_i + F^{ma}(A_i \cdot F^m(B)_i)$$

Each of the transformations $F^{ma}$ may include operations such as convolutions, non-linear activations, up-sampling (to match the lower resolution of B to the higher resolution of A), and the like, as well as combinations thereof.

This add-multiply-add operation (which shall be referenced as "AMA" subsequently) combining a sum and a product of the features A and B by a weighted combination may demonstrate improved performance over an addition operation alone (which is likely to introduce blurred boundaries into image pixel data as a result of up-sampling), a multiplication operation alone (which is likely to boost signals common to both A and B but mask signals present in only A or only B), as well as any combination of operations including a concatenation operation (which is expected to be more computationally intensive while increasing feature dimensionality).

FIGS. 4A and 4B illustrate an attention mapping module 400 according to example embodiments of the present disclosure.

According to example embodiments of the present disclosure, the attention mapping module 400 receives a set of fused features and performs attention mapping upon the fused strategies by a pairwise attention operation 402 and a parallel unary attention operation 404.

According to the pairwise attention operation 402, attention may be mapped over non-local pairwise pixels of the fused features to generate a long-range attention map, identifying semantic context dependencies over large-scale ranges across the features. Mapping attention over non-local pairwise pixels may be performed by, for example, Asymmetric Pyramid Non-local Block incorporating pyramid subsampling, as proposed by Zhu et al. However, pairwise attention mapping alone in this manner is expected to emphasize large-scale dependencies and interactions between pixels and/or features, potentially at the expense of overlooking or de-emphasizing small-scale dependencies between pixels and/or features.

FIG. 4B is an inset of FIG. 4A illustrating the parallel unary attention operation 404. As illustrated in FIG. 4B, a convolution operation 406 is applied to the fused features. The convolution operation may be, for example, a strided convolution. Next, a sigmoid function 408 is applied to the fused features to generate importance weights 410. Next, the importance weights are multiplied with the fused features (passed forward as residuals by a skip connection 412) to generate a position-sensitive attention map 414.

After both the pairwise attention operation 402 and the parallel unary attention operation 404 are completed, the long-range attention map and the position-sensitive attention map are added to generate combined attention map. This combined attention mapping operation may demonstrate (as shall be discussed subsequently with reference to experimental results) improved performance over attention mapping by addition alone, attention mapping by multiplication alone, attention mapping by addition and multiplication performed in sequence in either order, or attention mapping by concatenation.

Table 1 illustrates comparative performance of the above-mentioned methodologies, as well as a baseline methodology incorporating only pyramid subsampling. Mean intersection over union ("mIoU") is used to measure accuracy of segmentations output by each model (the degrees to which computed segmentations overlap actual segmentations). Higher mIoU indicates better performance.

| method | mIoU | Δ mIoU |
|---|---|---|
| pyramid (baseline) | 76.1 | — |
| +pairwise | 77.5 | +1.4 |
| +unary + pairwise (sequential) | 77.8 | +1.7 |
| +pairwise + unary (sequential) | 78.1 | +2.0 |
| +PUP (parallel unary-pairwise) | 78.3 | +2.2 |

Figure 4C:
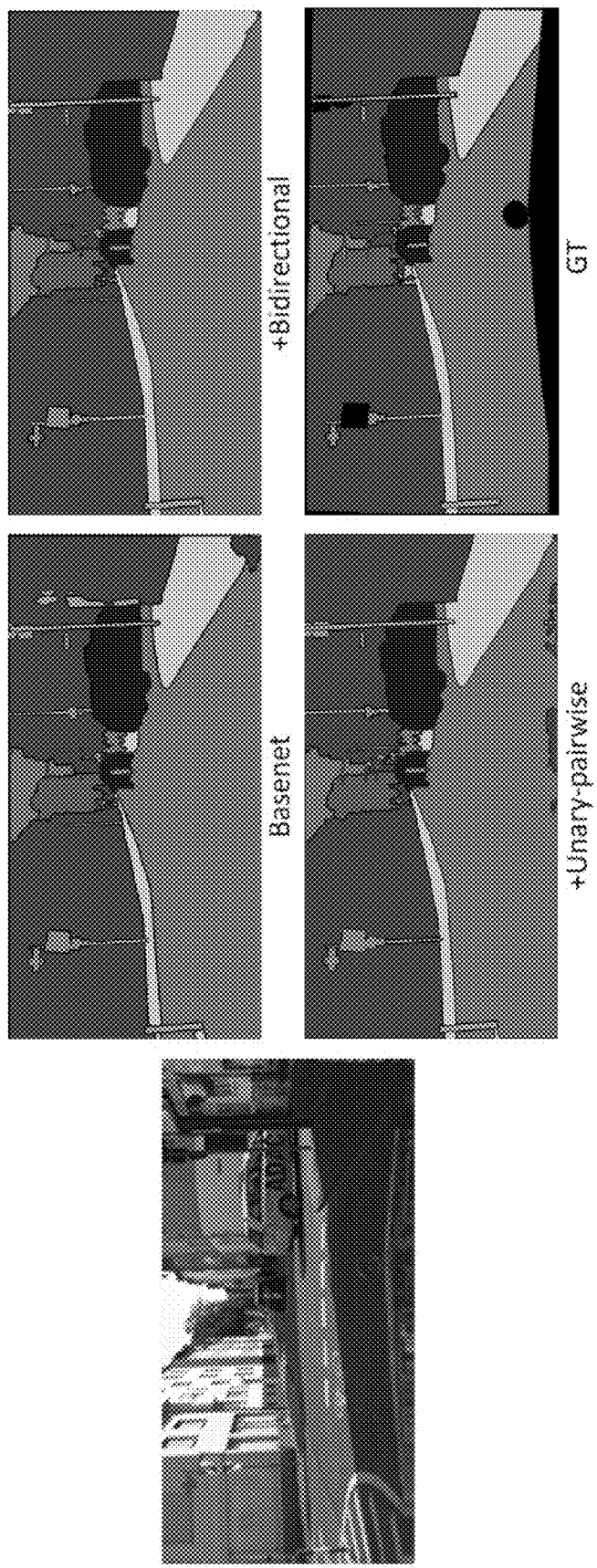
FIG. 4C illustrates comparative performance of the attention mapping module.

It can be seen that merely utilizing parallel unary attention mapping according to example embodiments of the present disclosure in sequence with pairwise attention mapping improves performance, and using both in combination according to example embodiments of the present disclosure improves performance further. Furthermore, as FIG. 4C illustrates, the parallel unary-pairwise methodology performs closest to the ground truth ("GT") labeled segmentations by detecting more fine detail between the multiple lampposts compared to the other methodologies illustrated.

Training of a learning model 200 according to example embodiments of the present disclosure may be performed by steps as described below.

The learning model may be stored on storage of any learning system as described above having one or more physical or virtual processor(s) capable of executing the learning model to compute tasks for particular functions.

Sample data may generally be any labeled dataset indicating particular features of images and/or particular segmentations within images, at least some segmentations having semantic meaning distinct from each other. The dataset may be labeled to indicate that features, segmentations, and other aspects of images are positive or negative for a particular result, such as presence or absence of an object which may be detected. Moreover, the dataset may be labeled to indicate attention among different segmentations within images.

A loss function, or more generally an objective function, is generally any mathematical function having an output which may be optimized during the training of a learning model.

Training of the learning model may, in part, be performed to train the learning model on at least one loss function to learn a weight set operative to compute a task for a particular function. The at least one loss function may be any conventional objective function operative for the learning model to be trained on for this purpose. For example, the at least one loss function may be an object detection loss function utilized in training a learning model to perform object detection tasks from images.

As object detection problems generally feature relatively few positively labeled samples compared to many negatively labeled samples with regard to any particular result, object detection loss functions may focus on finding the hardest negatively labeled samples among all negatively labeled samples. For example, an object detection loss function may be an online hard example mining ("OHEM") loss function, operative to select negatively labeled samples having highest loss.

The at least one loss function may be a boundary detection loss function utilized in training a learning model to perform boundary detection tasks from images. For example, a boundary detection loss function may be a Dice loss function, operative to detect similarity between two samples at both small-scale and large-scale.

For example, according to example embodiments of the present disclosure, a primary loss function may be a joint OHEM and Dice loss function, and the learning model may additionally be trained on multiple auxiliary loss functions as known to persons skilled in the art directed to the above-mentioned tasks or other related tasks. According to example embodiments of the present disclosure, the learning model may be trained on the primary loss function at the ultimate output of the learning model 200, and may be trained on one or more auxiliary loss functions at lateral convolutions of the bottommost convolutional layer 208.

A reference dataset may be obtained for the task, and a weight set may be initialized. The reference dataset may be augmented by techniques such as mean subtraction, random flip, random scale (by factors both smaller and larger than 1), and the like, then randomly cropped to a common original resolution. To avoid the weight set from vanishing to 0 values or exploding to infinity values, problems as known to persons skilled in the art, a weight set initialization should generally not be values of 0 or 1 or any other arbitrary value, but may be based on expected means and standard deviations of outputs of a non-linear activation function of convolutional layers. For example, the weight set initialization may be according to Kaiming initialization as known to persons skilled in the art.

The learning model may be trained on each loss function taking sample image data of a set batch size per iteration, starting from an initial learning rate accelerated by a set momentum per iteration and decaying by a set decaying factor per iteration, such as according to a polynomial schedule. The learning model may be trained for a set number of epochs, an epoch referring to a period during which an entire dataset (in turn, the abovementioned sample dataset and the reference dataset) is computed by the learning model once and the weight set is updated based thereafter.

An epoch is divided into multiple batches; during each batch, a subset of the reference data is computed by the learning model. The reference dataset may be segmented into multiple subsets, each for input during one batch.

The weight set may be updated according to gradient descent ("GD") (that is, updated after computation completes for an epoch), stochastic gradient descent ("SGD"), mini-batch stochastic gradient descent ("MB-SGD") (that is, updated after computation of each batch), backpropagation ("BP"), or any suitable other manner of updating weight sets as known to persons skilled in the art. According to example embodiments of the present disclosure, weight sets may be updated by SGD after each epoch.

Subsequent to training, the weight set may be stored by the learning system. Subsequent computation of tasks such as semantic segmentation by the learning model may be performed by the learning system loading the weight set into memory and executing the learning model to compute segmentations for sample image data input into the learning model, using the weight set.

Figure 5A:
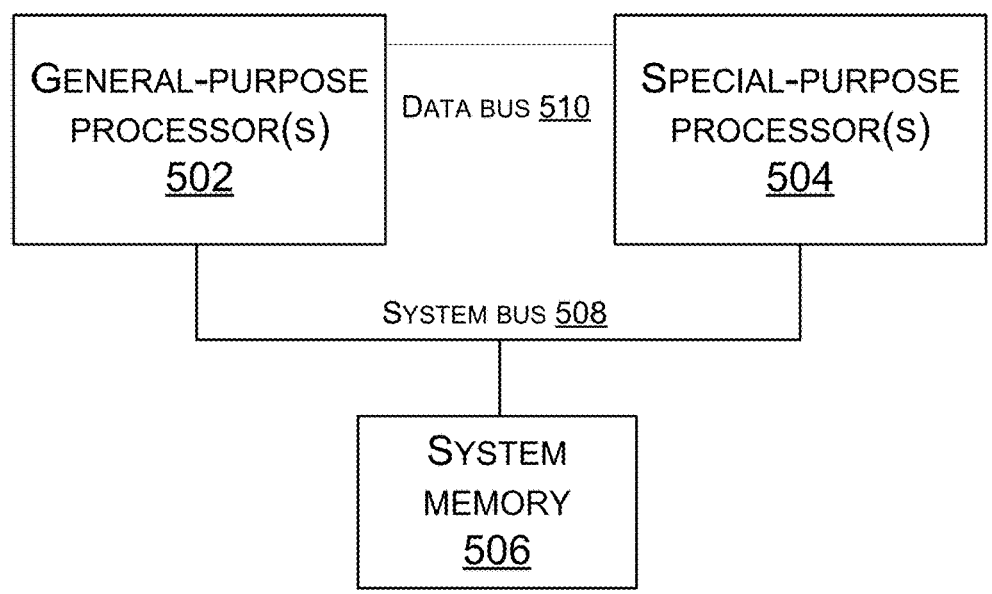
FIGS. 5A and 5B illustrate a system architecture of a system configured to perform image data semantic segmentation according to example embodiments of the present disclosure.
Figure 5B:
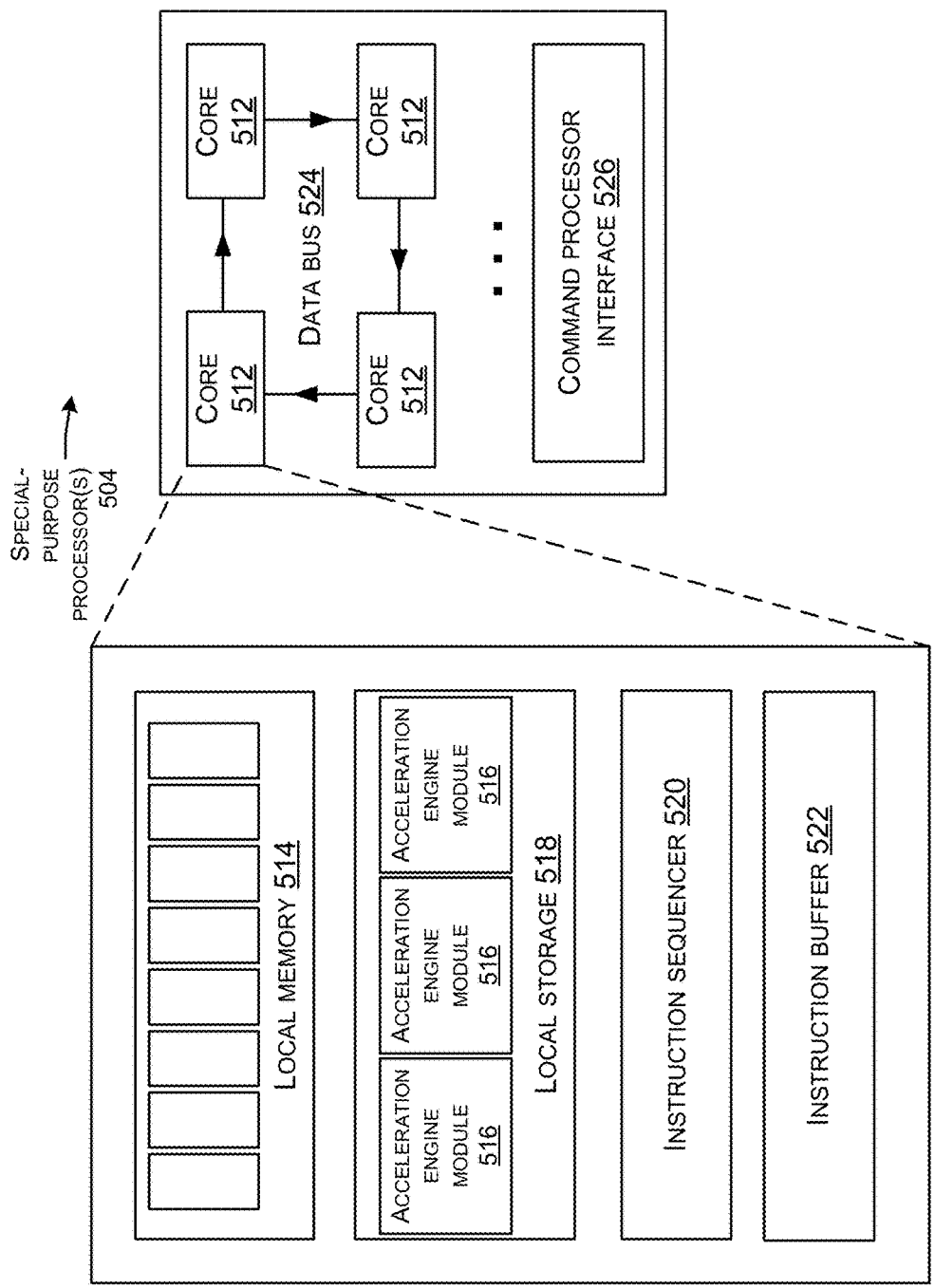

FIGS. 5A and 5B illustrate a system architecture of a system 500 configured to perform image data semantic segmentation according to example embodiments of the present disclosure.

A system 500 according to example embodiments of the present disclosure may include one or more general-purpose processor(s) 502 and one or more special-purpose processor(s) 504. The general-purpose processor(s) 502 and special-purpose processor(s) 504 may be physical or may be virtualized and/or distributed. The general-purpose processor(s) 502 and special-purpose processor(s) 504 may execute one or more instructions stored on a computer-readable storage medium as described below to cause the general-purpose processor(s) 502 or special-purpose processor(s) 504 to perform a variety of functions. Special-purpose processor(s) 504 may be computing devices having hardware or software elements facilitating computation of neural network computing tasks such as training and inference computations. For example, special-purpose processor(s) 504 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as matrix multiplication, special-purpose processor(s) 504 may, for example, implement engines operative to compute mathematical operations such as matrix operations and vector operations.

A system 500 may further include a system memory 506 communicatively coupled to the general-purpose processor(s) 502 and the special-purpose processor(s) 504 by a system bus 508. The system memory 506 may be physical or may be virtualized and/or distributed. Depending on the exact configuration and type of the system 500, the system memory 506 may be volatile, such as RAM, non-volatile, such as ROM, flash memory, miniature hard drive, memory card, and the like, or some combination thereof.

The system bus 508 may transport data between the general-purpose processor(s) 502 and the system memory 506, between the special-purpose processor(s) 504 and the system memory 506, and between the general-purpose processor(s) 502 and the special-purpose processor(s) 504. Furthermore, a data bus 510 may transport data between the general-purpose processor(s) 502 and the special-purpose processor(s) 504. The data bus 510 may, for example, be a Peripheral Component Interconnect Express ("PCIe") connection, a Coherent Accelerator Processor Interface ("CAPI") connection, and the like.

FIG. 5B illustrates an example of special-purpose processor(s) 504, including any number of core(s) 512. Processing power of the special-purpose processor(s) 504 may be distributed among the core(s) 512. Each core 512 may include local memory 514, which may contain pre-initialized data, such as model parameters, or data structures, such as constant buffers for batch normalization or quantization, for the performance of special-purpose computing. Each core 512 may further be configured to execute one or more sets of computer-executable acceleration engine modules 516 pre-initialized on local storage 518 of the core 512, which may each be executable by the core(s) 512, including execution in parallel by multiple core(s) 512, to perform or accelerate, for example, arithmetic operations such as matrix multiplication or matrix transposition, function operations, or specially defined operations such as optimizing one or more loss functions as described herein. Each core 512 may further include an instruction sequencer 520, which receives and orders instructions received from an instruction buffer 522. Some number of core(s) 512, such as four, may be in communication by a data bus 524, such as a unidirectional ring bus. Software drivers controlling operation of each core 512 may control the core(s) 512 and synchronize their operations by sending executable commands through a command processor interface 526.

Datasets may be transported to special-purpose processor(s) 504 over a system bus 508 or a data bus 510, where training of learning models and computation of semantic segmentation by learning models may be performed by the special-purpose processor(s) 504 on the data series as described herein, and output segmentations as described herein.

Figure 6:
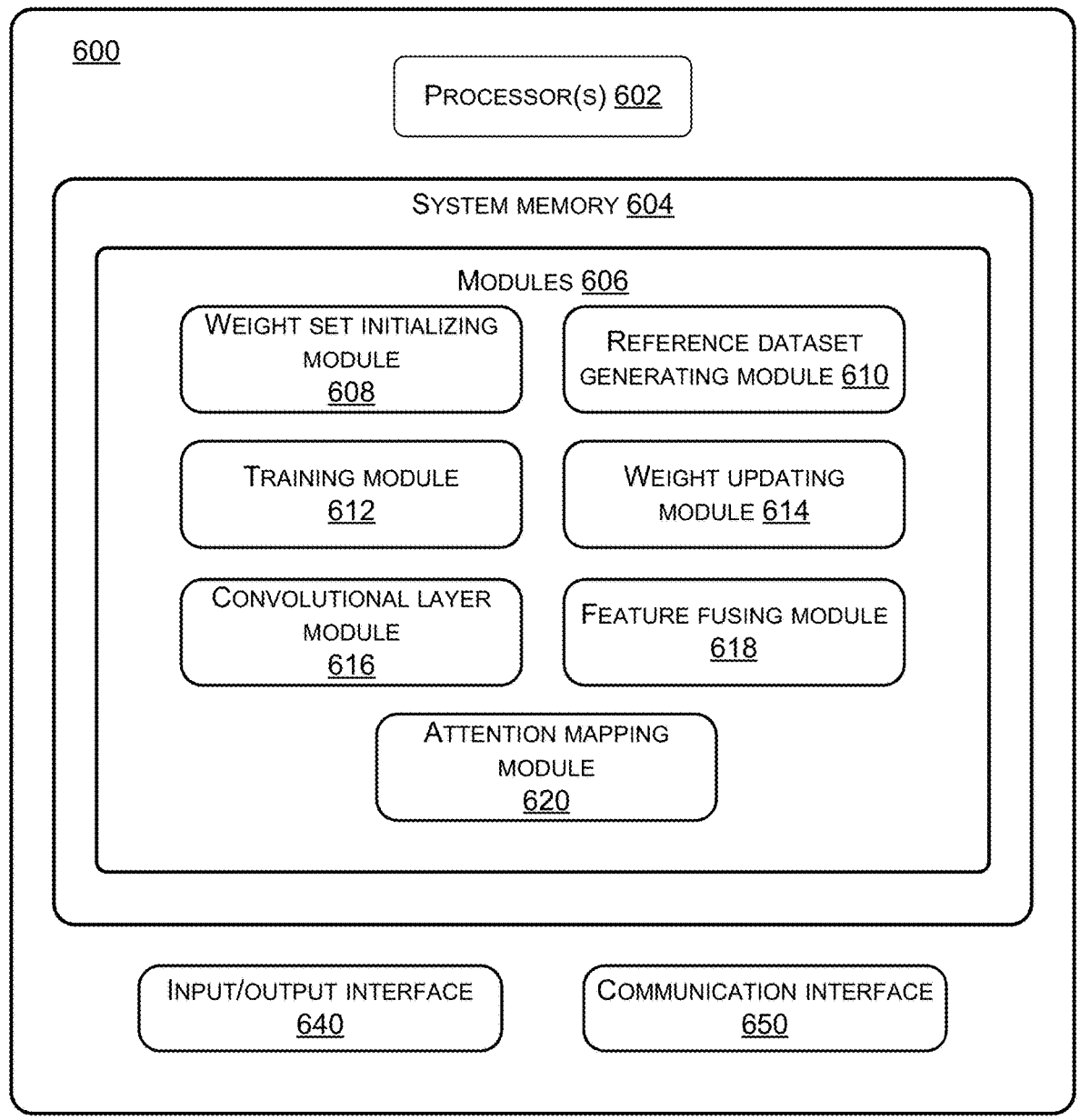
FIG. 6 illustrates an example system for implementing the processes and methods described herein for implementing semantic segmentation.

FIG. 6 illustrates an example system 600 for implementing the processes and methods described above for implementing semantic segmentation.

The techniques and mechanisms described herein may be implemented by multiple instances of the system 600, as well as by any other computing device, system, and/or environment. The system 600 may be a distributed system composed of multiple physically networked computers or web servers, a physical or virtual cluster, a computing cloud, or other networked computing architectures providing physical or virtual computing resources as known by persons skilled in the art. Examples thereof include learning systems as described above with reference to FIG. 1. The system 600 shown in FIG. 6 is only one example of a system and is not intended to suggest any limitation as to the scope of use or functionality of any computing device utilized to perform the processes and/or procedures described above.

Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 600 may include one or more processors 602 and system memory 604 communicatively coupled to the processor(s) 602. The processor(s) 602 and system memory 604 may be physical or may be virtualized and/or distributed. The processor(s) 602 may execute one or more modules and/or processes to cause the processor(s) 602 to perform a variety of functions. In embodiments, the processor(s) 602 may include a central processing unit ("CPU"), a GPU, an NPU, a TPU, any combinations thereof, or other processing units or components known in the art. Additionally, each of the processor(s) 602 may possess its own local memory, which also may store program modules, program data, and/or one or more operating systems.

Depending on the exact configuration and type of the system 600, the system memory 604 may be volatile, such as RAM, non-volatile, such as ROM, flash memory, miniature hard drive, memory card, and the like, or some combination thereof. The system memory 604 may include one or more computer-executable modules 606 that are executable by the processor(s) 602. The modules 606 may be hosted on a network as services for a data processing platform, which may be implemented on a separate system from the system 600.

The modules 606 may include, but are not limited to, a weight set initializing module 608, a reference dataset generating module 610, a training module 612, a weight updating module 614, a convolutional layer module 616, a feature fusing module 618, and an attention mapping module 620.

The weight set obtaining module 608 may be configured to initialize a weight set prior to training of a learning model on a sample dataset and on at least one loss function as described above.

The reference dataset generating module 610 may be configured to generate a reference dataset as described above.

The training module 612 may be configured to train the learning model on the at least one loss function as described above.

The convolutional layer module 614 may be configured to receive features, perform convolution operations thereon, and output features and re-sampled features as described above with reference to any of the bottommost convolutional layer 208; topmost convolutional layers 210A and 210B; preliminary convolutional layer 212; next convolutional layer 214; further next convolutional layer 216; and yet further next convolutional layer 218 as described above with reference to FIG. 2.

The feature fusing module 618 may be configured to perform feature fusion as described above with reference to FIG. 3.

The attention mapping module 620 may be configured to perform combined attention mapping as described above with reference to FIG. 4.

The system 600 may additionally include an input/output (I/O) interface 640 and a communication module 650 allowing the system 600 to communicate with other systems and devices over a network, such as the data processing platform, a computing device of a data owner, and a computing device of a data collector. The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-4B. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Performance of semantic segmentation according to example embodiments of the present disclosure is measured against several semantic segmentation learning models as known in the art. These include:

ICNet, as proposed by Zhao et al.;
BiSeNet, as proposed by Yu et al.; and
DFANet, as proposed by Yoo et al.

Two versions of the learning model of the present disclosure are tested: BPNet-S3, trained for efficient performance with lower computational overhead, and BPNet-S4, trained for greater accuracy with higher computational overhead.

The following published datasets were used for each performance test:

Cityscapes, published by Cordts et al., and particularly the approximately 5,000 sample images therein annotated at pixel level; and CamVid, published by Brostow et al., containing 701 road scenes annotated at pixel level.

In Table 2 below, each of the above models is tested on the Cityscapes dataset in real time, with number of model parameters denoted as "params." As computational intensity is generally relevant in designing real-time semantic segmentation systems, and frequency of image refreshes is also a factor when a feed of video images is being captured from a capture device or sensor, gigaflops ("GFLOPs") of work performed by computation and frames per second computed ("FPS") are also determined, where supported by the respective learning model. mIoU is used to measure accuracy of segmentations output by each model, where higher mIoU indicates better performance.

| method | params. | GFLOPs | FPS | mIoU val | mIoU test |
|---|---|---|---|---|---|
| ICNet [29] | 7.7 | — | 30.3 | 70.6 | 69.5 |
| BiSeNet(Res18) [1] | 13.4 | 104.3 | 41.7* | 74.8 | 74.7 |
| DFANet [30] | 7.8 | — | 100 | — | 71.3 |
| BPNet-S3-W32 | 5.1 | 74.2 | 36.5 | 77.2 | 76.3 |

BPNet-S3 ("W32" denoting a version of the model having 32C number of channels) according to the present disclosure demonstrated greater accuracy than each other model, and exhibited comparatively fast performance in terms of FPS.

In Table 3 below, each of the above models is tested on the CamVid dataset:

| Dataset | mIoU | params | FLOPs | FPS |
|---|---|---|---|---|
| SegNet [37] | 55.6 | 29.5 | — | 4.6 |
| ICNet [29] | 67.1 | 7.7 | — | 27.8 |
| BiSeNet(Res18) [1] | 68.7 | 13.4 | 34.5 | — |
| BPNet-S3 | 75.4 | 11.8 | 56.9 | 34 |
| BPNet-S3-W32 | 69.4 | 5.1 | 24.5 | 63 |

BPNet-S3 exhibited the best accuracy and considerably efficient workload based on a comparatively low number of parameters.

By the abovementioned technical solutions, the present disclosure provides a novel architecture for convolutional learning models for semantic segmentation not relying on encoder-decoder architecture or pre-training. A learning model may provide a hierarchy of convolutional layers configured to perform convolutions upon features, each layer other than a topmost layer convoluting the features at a lower resolution to a higher layer, and each layer other than a bottommost layer returning the features to a lower layer. Each layer fuses the lower resolution features received from a higher layer with same resolution features convoluted at the layer, so as to combine large-scale and small-scale features of images. Layers of the hierarchy may be substantially equal to a number of lateral convolutions at a bottommost convolutional layer. The bottommost convolutional layer ultimately passes the fused features to an attention mapping module, which utilizes two attention mapping pathways in combination to detect non-local dependencies and interactions between large-scale and small-scale features of images without de-emphasizing local interactions.

Example Clauses

A. A method comprising: performing, at a convolutional layer of a learning model, down-sampling convolution upon image features outputting to a higher convolutional layer; performing, at the convolutional layer, convolution upon same resolution image features; receiving, at the convolutional layer, lower resolution image features from the higher convolutional layer; and fusing, at the convolutional layer, the lower resolution image features received from the higher convolutional layer with the same resolution features convoluted at the same convolutional layer.

B. The method as paragraph A recites, wherein a number of convolutional layers of the learning model is substantially equal to a number of lateral convolutions of features within a bottommost convolutional layer of the learning model.

C. The method as paragraph B recites, wherein the number of convolutional layers of the learning model is four or five.

D. The method as paragraph A recites, further comprising a bottommost convolutional layer of the learning model passing highest resolution features to a higher convolutional layer.

E. The method as paragraph A recites, wherein lower resolution image features and same resolution features are fused by a weighted combination of a sum of the lower resolution image features and same resolution features and a product of the lower resolution image features and the same resolution features.

F. The method as paragraph A recites, further comprising an attention mapping module performing more than one attention mapping upon the fused features to generate an attention map of the fused features.

G. The method as paragraph F recites, wherein at least one attention mapping performed is a parallel unary attention operation.

H. A system comprising: one or more processors; and memory communicatively coupled to the one or more processors, the memory storing computer-executable modules executable by the one or more processors that, when executed by the one or more processors, perform associated operations, the computer-executable modules comprising: a convolutional layer module configured to perform down-sampling convolution upon image features outputting to a higher convolutional layer module; perform convolution upon same resolution image features; and receive lower resolution image features from the higher convolutional layer module; and a feature fusing module configured to fuse lower resolution image features received from the higher convolutional layer module with the same resolution features convoluted at the same convolutional layer module.

I. The system as paragraph H recites, wherein a number of convolutional layer modules is substantially equal to a number of lateral convolutions of features within a bottommost convolutional layer module.

J. The system as paragraph I recites, wherein the number of convolutional layer modules is four or five.

K. The system as paragraph H recites, further comprising a bottommost convolutional layer module passing highest resolution features to a higher convolutional layer module.

L. The system as paragraph H recites, wherein the feature fusing module is configured to fuse lower resolution image features and same resolution image features by a weighted combination of a sum of the lower resolution image features and same resolution image features and a product of the lower resolution image features and the same resolution image features.

M. The system as paragraph H recites, further comprising an attention mapping module configured to perform more than one attention mapping upon the fused features to generate an attention map of the fused features.

N. The system as paragraph M recites, wherein at least one attention mapping performed is a parallel unary attention operation.

O. A computer-readable storage medium storing computer-readable instructions executable by one or more processors, that when executed by the one or more processors, cause the one or more processors to perform operations comprising: performing, at a convolutional layer of a learning model, down-sampling convolution upon image features outputting to a higher convolutional layer; performing, at the convolutional layer, convolution upon same resolution image features; receiving, at the convolutional layer, lower resolution image features from the higher convolutional layer; and fusing, at the convolutional layer, the lower resolution image features received from the higher convolutional layer with the same resolution features convoluted at the same convolutional layer.

P. The computer-readable storage medium as paragraph O recites, wherein a number of convolutional layers of the learning model is substantially equal to a number of lateral convolutions of features within a bottommost convolutional layer of the learning model.

Q. The computer-readable storage medium as paragraph P recites, wherein the number of convolutional layers of the learning model is four or five.

R. The computer-readable storage medium as paragraph O recites, wherein the operations further comprise a bottommost convolutional layer of the learning model passing highest resolution features to a higher convolutional layer.

S. The computer-readable storage medium as paragraph O recites, wherein lower resolution image features and same resolution image features are fused by a weighted combination of a sum of the lower resolution image features and same resolution image features and a product of the lower resolution image features and the same resolution image features.

T. The computer-readable storage medium as paragraph O recites, wherein the operations further comprise an attention mapping module performing more than one attention mapping upon the fused features to generate an attention map of the fused features.

U. The computer-readable storage medium as paragraph T recites, wherein at least one attention mapping performed is a parallel unary attention operation.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
performing, at a convolutional layer of a learning model, a down-sampling convolution upon image features outputting to a higher convolutional layer, the learning model including a plurality of convolutional layers arranged in a top-bottom hierarchy, a level of the higher convolutional layer being higher than a level of the convolutional layer in the top-bottom hierarchy, a sampled resolution of the higher convolutional layer being smaller than a sample resolution of the convolutional layer;
performing, at the convolutional layer, convolution upon same resolution image features;
receiving, at the convolutional layer, lower resolution image features from the higher convolutional layer; and
fusing, at the convolutional layer, the lower resolution image features received from the higher convolutional layer with the same resolution image features convoluted at the same convolutional layer to combine large-scale and small-scale features of images.

2. The method of claim 1, wherein a number of the convolutional layers of the learning model is substantially equal to a number of lateral passes at a bottommost convolutional layer of the learning model.

3. The method of claim 1, wherein the down-sampling convolution comprises a strided convolution, a pooling convolution, or a combination thereof.

4. The method of claim 1, further comprising a bottommost convolutional layer of the learning model passing highest resolution features to the higher convolutional layer.

5. The method of claim 1, wherein the lower resolution image features and the same resolution image features are fused by a weighted combination of a sum of the lower resolution image features and the same resolution image features and a product of the lower resolution image features and the same resolution image features.

6. The method of claim 1, further comprising an attention mapping module performing more than one attention mapping upon features from the fusing to generate an attention map of fused features.

7. The method of claim 6, wherein at least one attention mapping performed is a parallel unary attention operation.

8. A system comprising:
one or more processors; and
memory communicatively coupled to the one or more processors, the memory storing computer-executable modules executable by the one or more processors that, when executed by the one or more processors, perform associated operations, the computer-executable modules comprising:
a convolutional layer module configured to:
perform, at a convolutional layer of a learning model, a down-sampling convolution upon image features outputting to a higher convolutional layer, the learning model including a plurality of convolutional layers arranged in a top-bottom hierarchy, a level of the higher convolutional layer being higher than a level of the convolutional layer in the top-bottom hierarchy, a sampled resolution of the higher convolutional layer being smaller than a sample resolution of the convolutional layer;
perform convolution upon same resolution image features; and
receive lower resolution image features from the higher convolutional layer; and a feature fusing module configured to fuse the lower resolution image features received from the higher convolutional layer with the same resolution image features convoluted at a same convolutional layer.

9. The system of claim 8, wherein a number of convolutional layer modules is substantially equal to a number of lateral passes at a bottommost convolutional layer module.

10. The system of claim 8, wherein the down-sampling convolution comprises a strided convolution, a pooling convolution, or a combination thereof.

11. The system of claim 8, further comprising a bottommost convolutional layer module passing highest resolution features to the higher convolutional layer module.

12. The system of claim 8, wherein the feature fusing module is configured to fuse the lower resolution image features and the same resolution image features by a weighted combination of a sum of the lower resolution image features and the same resolution image features and a product of the lower resolution image features and the same resolution image features.

13. The system of claim 8, further comprising an attention mapping module configured to perform more than one attention mapping upon features from the fusing to generate an attention map of fused features.

14. The system of claim 13, wherein at least one attention mapping performed is a parallel unary attention operation.

15. A computer-readable storage medium storing computer-readable instructions executable by one or more processors, that when executed by the one or more processors, cause the one or more processors to perform operations comprising:
    performing, at a convolutional layer of a learning model, a down-sampling convolution upon image features outputting to a higher convolutional layer, the learning model including a plurality of convolutional layers arranged in a top-bottom hierarchy, a level of the higher convolutional layer being higher than a level of the convolutional layer in the top-bottom hierarchy, a sampled resolution of the higher convolutional layer being smaller than a sample resolution of the convolutional layer;
    performing, at the convolutional layer, convolution upon same resolution image features;
    receiving, at the convolutional layer, lower resolution image features from the higher convolutional layer; and
    fusing, at the convolutional layer, the lower resolution image features received from the higher convolutional layer with the same resolution image features convoluted at the same convolutional layer, a number of the convolutional layers of the learning model being equal to a number of lateral passes at a bottommost convolutional layer of the learning model.

16. The computer-readable storage medium of claim 15, wherein the down-sampling convolution comprises a strided convolution, a pooling convolution, or a combination thereof.

17. The computer-readable storage medium of claim 15, wherein the operations further comprise a bottommost convolutional layer of the learning model passing highest resolution features to the higher convolutional layer.

18. The computer-readable storage medium of claim 15, wherein the lower resolution image features and the same resolution image features are fused by a weighted combination of a sum of the lower resolution image features and the same resolution image features and a product of the lower resolution image features and the same resolution image features.

19. The computer-readable storage medium of claim 15, wherein the operations further comprise an attention mapping module performing more than one attention mapping upon fused features to generate an attention map of features from the fusing.

\* \* \* \* \*